(12) United States Patent
Chewning et al.

(10) Patent No.: US 9,721,001 B2
(45) Date of Patent: Aug. 1, 2017

(54) AUTOMATIC QUESTION DETECTION IN NATURAL LANGUAGE

(71) Applicant: Intel Corporation, Santa Clara, CA (US)

(72) Inventors: Ceara Chewning, Beaverton, OR (US); Christopher J. Lord, Portland, OR (US); Mark D. Yarvis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/317,604

(22) Filed: Jun. 27, 2014

(65) Prior Publication Data

US 2015/0378988 A1    Dec. 31, 2015

(51) Int. Cl.
*G06F 17/27* (2006.01)
*G06F 17/30* (2006.01)
*G06Q 10/10* (2012.01)

(52) U.S. Cl.
CPC .... *G06F 17/30654* (2013.01); *G06F 17/2705* (2013.01); *G06F 17/2765* (2013.01); *G06F 17/2785* (2013.01); *G06Q 10/10* (2013.01); *G06F 17/271* (2013.01); *G06F 17/274* (2013.01); *G06F 17/2755* (2013.01)

(58) Field of Classification Search
CPC .. G06F 17/2785; G06F 17/274; G06F 17/271; G06F 17/277; G06F 17/2755; G06F 17/2872; G06F 17/289
USPC .................................................. 704/9, 4, 6
See application file for complete search history.

(56) References Cited

U.S. PATENT DOCUMENTS

| | | | | |
|---|---|---|---|---|
| 5,878,385 | A | * 3/1999 | Bralich | G06F 17/2705 704/10 |
| 2006/0190804 | A1 | * 8/2006 | Yang | G06F 17/248 715/236 |
| 2013/0007037 | A1 | 1/2013 | Azzam et al. | |
| 2014/0214429 | A1 | * 7/2014 | Pantel | G10L 21/16 704/275 |

OTHER PUBLICATIONS

Wikipedia, "Auxiliary verb", Wikipedia, the free encyclopedia, May 13, 2014, 8 pages. Retrived from: http://en.wikipedia.org/wiki/Auxiliary_verb.
Andrew Carnie, "Syntax", A Generative Interoduction, Third Edition, 2013, 61 pages.
Shrestha, et al., "Detection of Question-Answer Pairs in Email Conversations", Columbia University, Computer Science Department, New York, NY 10027, 2004, 7 pages.
Wikipedia, "English Modal Verbs", From Wikipedia, the free encyclopedia, May 13, 2014, 15 pages. Retrived from: http://en.wikipedia.org/wiki/English_modal_verbs.
(Continued)

*Primary Examiner* — Vu B Hang
(74) *Attorney, Agent, or Firm* — Jordan IP Law, LLC (57) ABSTRACT

Systems and methods may provide for separating a sentence into a plurality of clauses and applying a set of question detection rules to each of the plurality of clauses. Additionally, the sentence may be automatically designated as a question if the question detection rules indicate that at least one of the plurality of clauses is a question. In one example, at least one of the question detection rules defines an order of a plurality of parts of speech.

24 Claims, 5 Drawing Sheets

(56) References Cited

OTHER PUBLICATIONS

Gate, "ANNIE: A Nearly-New Information Extraction System", Chapter 6, retrieved on Oct. 9, 2014, 13 pages. retrieved from: https://gate.ac.uk/sale/tao/splitch6.html.

"Natural Language Toolkit—NLTK 3.0 documentation", retrieved on Oct. 9, 2014, 2 pages. retrieved from: http://www.nltk.org.

The Apache Software Foundation, "Apache Open NLP Developer Documentation_PA", Written and maintained by the Apache OpenNLP Development Community, Version 1.5.3, retrieved on Oct. 9, 2014, 36 pages.

European Search Report for EP Patent Application No. 15167657.4, mailed Nov. 12, 2015, 7 pages.

Kai Wang, et al., "Exploiting Salient Patterns for Question Detection and Question Retrieval in Community-based Question Answering", Proceedings of the 23rd International Conference on Computational Linguistics, Aug. 2010, Beijing, 9 pages.

Baichuan Li, et al., "Question Identification on Twitter", Proceedings of the 20th ACM Conference on Information and Knowledge Management, CIKM 2011, Oct. 24-28, 2011, Glasgow, United Kingdom, 4 pages.

\* cited by examiner

AUTOMATIC QUESTION DETECTION IN NATURAL LANGUAGE

TECHNICAL FIELD

Embodiments generally relate to automated question detection in natural language settings. More particularly, embodiments relate to the use of clause-based question detection in natural language settings.

BACKGROUND

Conventional approaches to automated question detection may generally analyze each encountered sentence as a whole. These approaches may include looking for keywords and "n-grams" (e.g., specific groupings of n-words) at the beginning or end of a sentence, using machine learning classifiers or full parsing to produce a hierarchical tree of the syntactic structure of the sentence, and so forth. While these approaches may be satisfactory under certain circumstances, there remains considerable room for improvement. For example, treating each sentence as a whole may render these approaches error-prone and/or impractical for a wide variety of applications. More particularly, the traditional n-gram approach may be unable to account for either intervening words that are not predefined as part of the n-gram or words located in the middle of the sentence, and the hierarchical tree approach may be computationally expensive, resource heavy and slow. As a result, neither approach may be suitable for real-time and/or low power applications such as, for example, personal assistant (PA) applications running on handheld devices.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
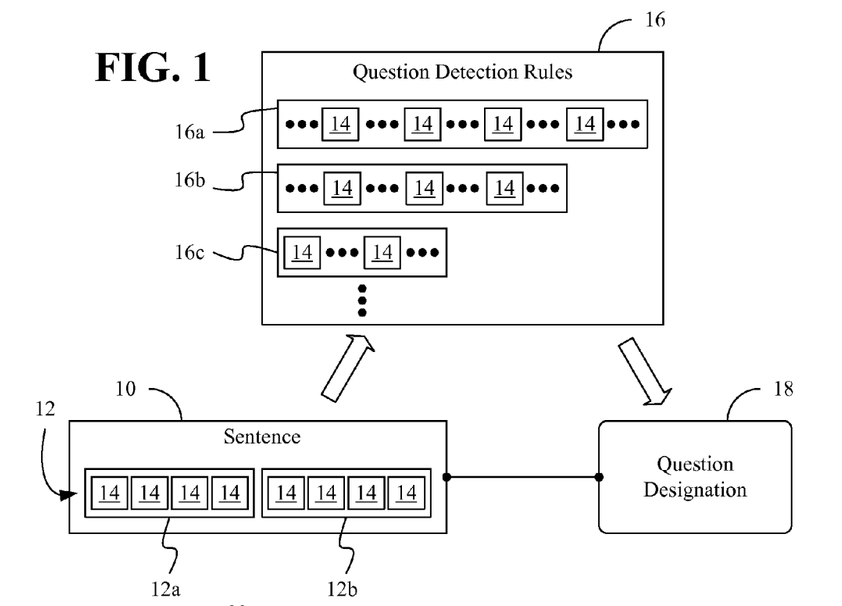
FIG. 1 is a block diagram of an example of a set of question detection rules being used to generate a question designation for a sentence according to an embodiment.

Turning now to FIG. 1, a sentence 10 shown, wherein the sentence 10 may be obtained from a message (e.g., email, text message, instant message/IM, social networking post, etc.), a speech recognition module that processes an audio feed (e.g., recording, microphone output), and so forth. In the illustrated example, the sentence 10 is separated into a plurality of clauses 12 (12a, 12b) containing words corresponding to various parts of speech (POS) 14. For example, the sentence 10 might be "could she see the stage when she went to the concert". In such a case, "could she see the stage" may be identified as a first clause 12a in the sentence 10 and "when she went to the concert" may be identified as a second clause 12b in the sentence 10. As will be discussed in greater detail, a set of question detection rules 16 (16a-16c) may be applied to each of the clauses 12, wherein if the question detection rules 16 indicate that at least one of the clauses 12 is a question, the sentence 10 may be automatically designated as a question via, for example, a question designation 18. Analyzing the sentence 10 on a clause-by-clause basis may reduce errors as well as computational overhead.

More particularly, each of the illustrated question detection rules 16 defines an order of the plurality of parts of speech 14, wherein the order permits intervening words that are not predefined. For example, a first question detection rule 16a might specify that when a "wh-word" (e.g., who, whom, what, where, when, why, how) is followed by a modal or auxiliary verb (e.g., can, must, should, would, could), followed by a noun followed by a verb, the entire sentence 10 may be automatically designated as a question. An auxiliary verb may be defined as a word that adds functional or grammatical meaning (e.g., tense, aspect, modality, voice, emphasis) to the clause in which it appears, whereas a modal verb may be defined as a class of auxiliary verbs used to express modality (e.g., possibility, obligation, ability, etc.). Of particular note is that, unlike in a typical n-gram solution, words positioned between the specified parts of speech 14 in the first question detection rule 16a would not prevent a given clause and its corresponding sentence from being identified as a question. Additionally, specifying the parts of speech 14 rather than particular keywords may increase the flexibility of the system and substantially improve accuracy.

Similarly, a second question detection rule 16b could specify that when a modal or auxiliary verb is followed by a noun, followed by a verb, the entire sentence 10 may be automatically designated as a question, wherein intervening words would not prevent such a designation from being made. Thus, such a rule may identify a clause such as "So, may Susan and her boyfriend come with us" as a question (e.g., modal auxiliary "may", followed by noun "Susan", followed by verb "come"). In yet another example, a third question detection rule 16c might specify that when a clause begins with a BE (e.g., "to be") or HAVE (e.g., "to have") word, (e.g., is, have, has) followed by a noun, the entire sentence 10 may be automatically designated as a question, wherein intervening words would not prevent such a designation from being made. Such a rule may therefore identify a clause such as "Is the building the grey one" as a question (e.g., HAVE word "Is", followed by noun "building", with intervening word "the"). Moreover, relevant words such as, for example, the words at the beginning of the second clause 12b, positioned near the middle of sentence 10 are taken into consideration in the illustrated example. As a result, question detection accuracy may be further improved. The linguistic convention of small capitalization (e.g., BE, HAVE) is used herein to indicate lexemes (i.e., the set of all inflections of the word).

Figure 2:
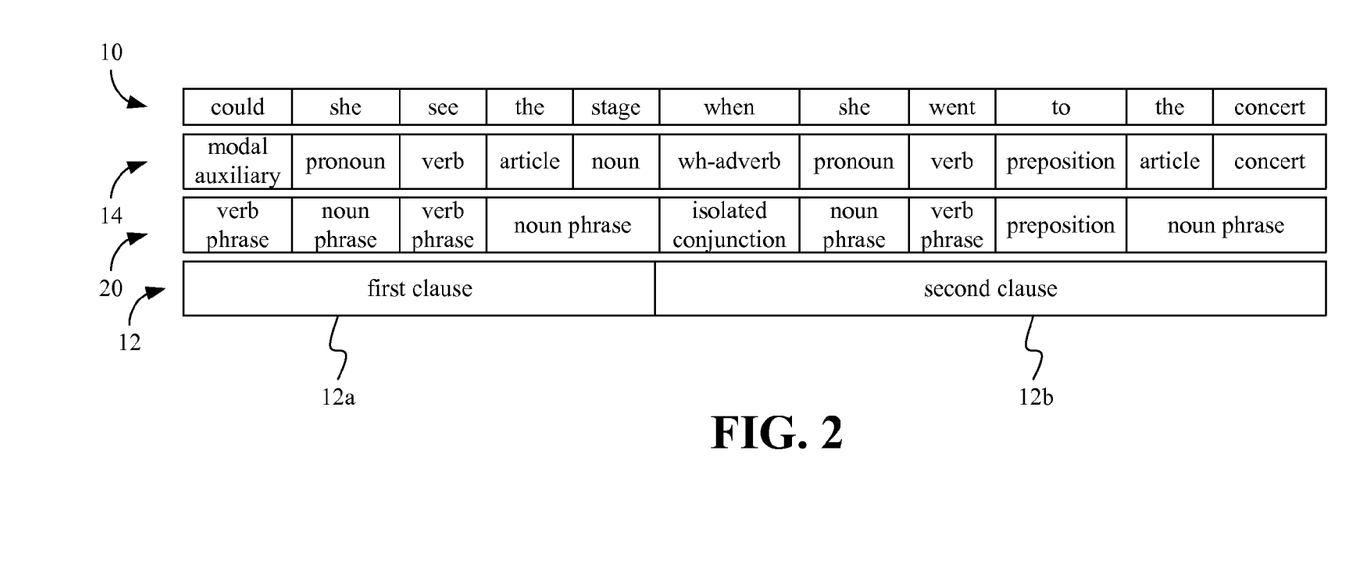
FIG. 2 is an illustration of an example of a sentence according to an embodiment.

FIG. 2 demonstrates that the words of the sentence 10 may be tagged with the parts of speech 14. The parts of speech 14 may in turn be used to identify phrase chunks 20 and the clauses 12. For example, the word "could" is identified as a modal auxiliary part of speech, a verb phrase and part of the first clause 12a, in the illustrated example. The word "when", on the other hand, may be identified as a wh-adverb part of speech, an isolated conjunction and part of the second clause 12b, in the illustrated example.

Figure 3:
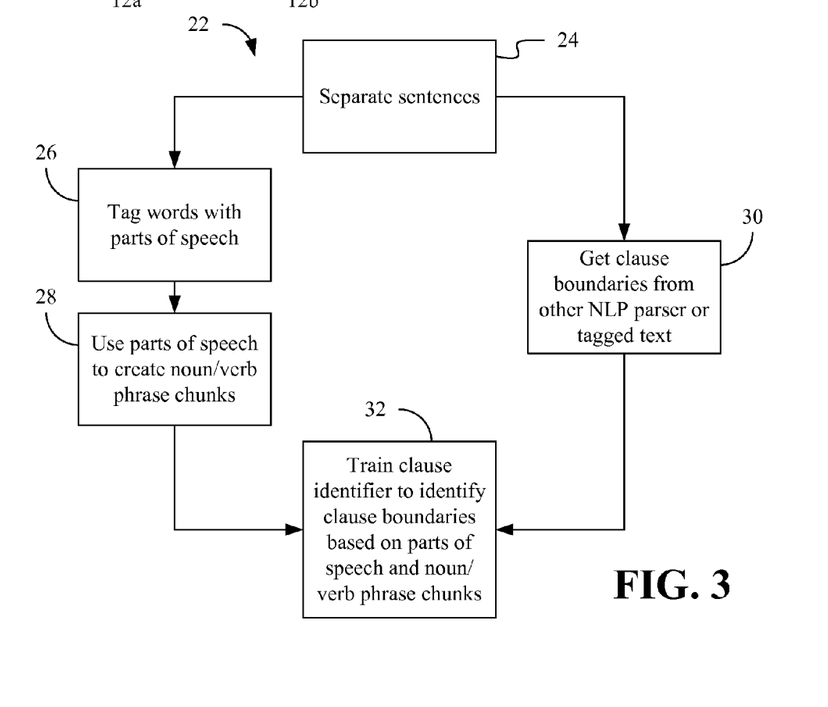
FIG. 3 is a flowchart of an example of a method of training a system according to an embodiment.

Turning now to FIG. 3, a method 22 of training a system to automatically separate sentences into clauses is shown. The method 22 may be implemented as a module or related component in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 22 may be written in any combination of one or more programming languages, including an object oriented programming language such as Java, Smalltalk, C++ or the like and conventional procedural programming languages, such as the "C" programming language or similar programming languages.

Illustrated processing block 24 provides for separating a message, speech recognition output, document, etc., into a plurality of sentences. A first path may involve tagging the words of the sentence with the parts of speech at block 26 and using the parts of speech to create noun/verb phrase chunks at block 28. A second path may involve obtaining clause boundaries for the sentences from another natural language processing (NLP) parser or tagged text at block 30. Illustrated block 32 trains a clause identifier to automatically identify clause boundaries based on the parts of speech and noun/verb phrase chunks generated in the first path and the known clause boundaries from the second path. Other approaches such as, for example, "clausifiers", "Brill taggers", and so forth, may be used train the system, depending upon the circumstances.

Figure 4:
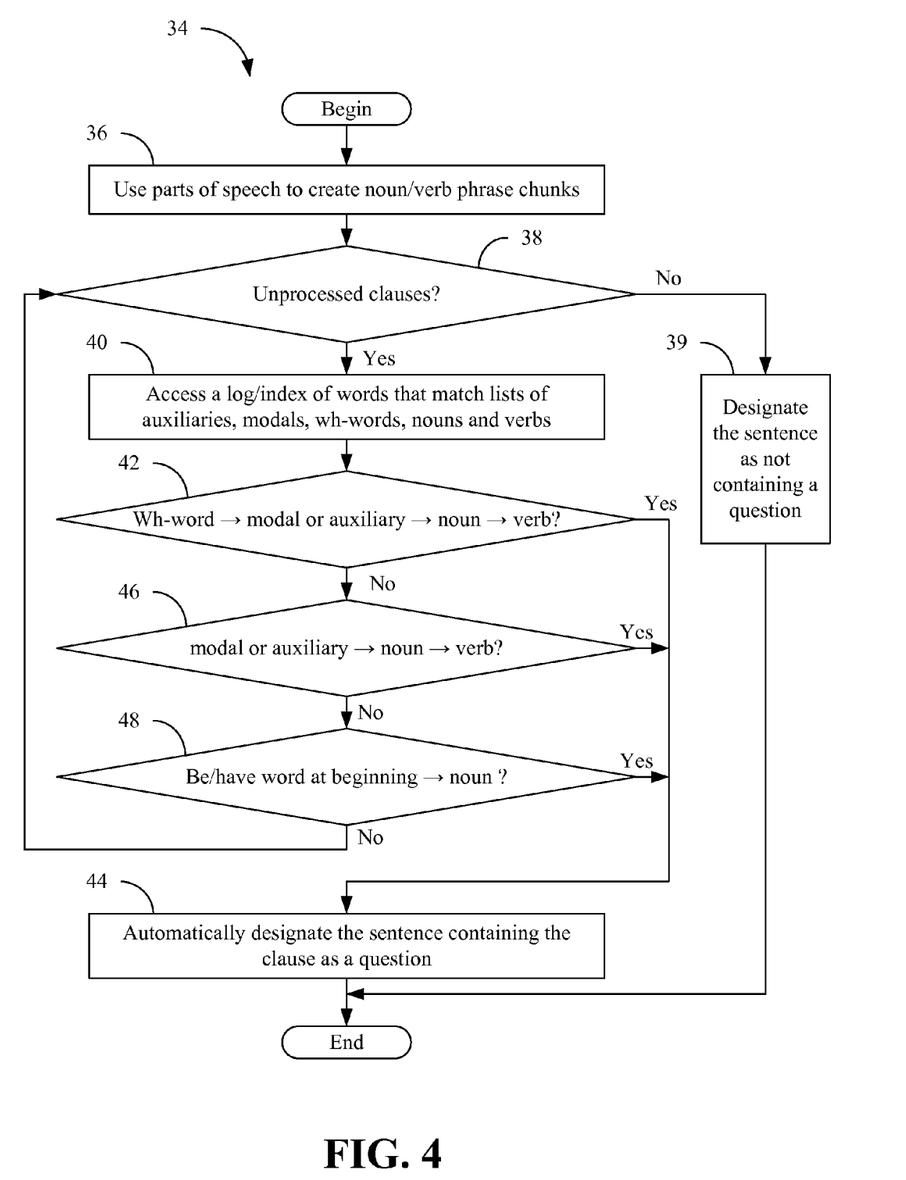
FIG. 4 is a flowchart of an example of a method of automatically detecting questions according to an embodiment.

FIG. 4 shows a method 34 of automatically detecting questions. The method 34 may also be implemented as a module or related component in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 36 uses the parts of speech assigned to the words of a sentence to create noun/verb phrase chunks such as the chunks 20 (FIG. 2). A determination may be made at block 38 as to whether there are unprocessed clauses in the sentence in question. If so, block 40 may access a log/index of words that match lists of auxiliaries, modals, wh-words, nouns and verbs, wherein a determination may be made at block 42 as to whether the clause includes a wh-word followed by a modal or auxiliary verb followed by a noun followed by a verb (e.g., wh-word→modal or auxiliary→noun→verb). If so, the sentence containing the clause may be automatically designated as a question at block 44.

Otherwise, illustrated block 46 determines whether the clause includes a modal or auxiliary verb followed by a noun followed by a verb (e.g., modal or auxiliary→noun→verb), wherein a positive determination at block 46 enables block 44 to automatically designate the sentence containing the clause as a question. Block 44 may also involve assigning a confidence score to the sentence in order to indicate the level of confidence in the question designation. Additionally, if a question designation is not triggered by block 46, illustrated block 48 determines whether the clause includes a BE or HAVE word followed by a noun. If so, the sentence containing the clause may be automatically designated as a question at block 44. If none of blocks 42, 46 or 48 result in the sentence being designated as a question, the determination at block 38 may be repeated. If it is determined at block 38 that there are no remaining unprocessed clauses, block 39 may designate the sentence as not containing a question and the illustrated method 34 may terminate. Block 39 may also involve assigning a confidence score to the sentence in order to indicate the level of confidence in the non-question designation.

Thus, with continuing reference to FIGS. 2 and 4, applying the method 34 to the sentence 10 would result in the first clause 12a being identified by block 46 as a sentence due to the occurrence of the modal auxiliary verb "could", followed by the pronoun "she", followed by the verb "see". The second clause 12b, on the other hand, might not be identified as a question due to the question detection rules reflected in blocks 42, 46 and 48 not being satisfied. The first clause 12a being identified as a question may result in the sentence 10 being automatically designated as a question.

Figure 5:
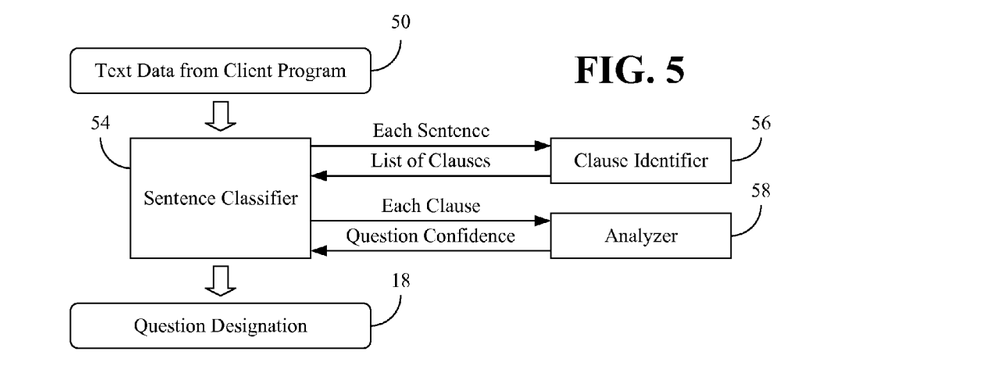
FIG. 5 is a block diagram of an example of a logic architecture according to an embodiment.

FIG. 5 shows a logic architecture that may be used as an apparatus to automatically detect questions. The logic architecture may generally implement one or more aspects of a method such as, for example, the method 34 (FIG. 4) of automatically detecting questions. In the illustrated example, text data 50 (e.g., a message) from a client program is received (e.g., via a network controller, voice input system, person-to-person communication link on a multi-user system, stored document interpretation system, scanned document interpretation system, optical character recognition/OCR system, etc.) and a sentence classifier 54 passes each sentence of the text data 50 to a clause identifier 56. The clause identifier 56, which may be an off-the-shelf library or a component trained via a method such as, for example, the method 22 (FIG. 3), may separate each sentence into a plurality of clauses and return a corresponding list of clauses to the sentence classifier 54.

The illustrated sentence classifier 54 passes each clause to an analyzer 58, which may be configured to apply a set of question detection rules to each of the plurality of clauses. As already noted, each question detection rule may define an order of a plurality of parts of speech, wherein the order permits intervening words that are not predefined. The analyzer 58 may also return a confidence score for each clause, wherein the confidence score indicates the level of confidence as to whether the clause is a question. Alternatively, the confidence score may be replaced with a binary indication of the presence of question syntax. The illustrated sentence classifier 54 automatically designates sentences as questions if the question detection rules indicate that at least one of the clauses within a given sentence is a question.

Figure 6:
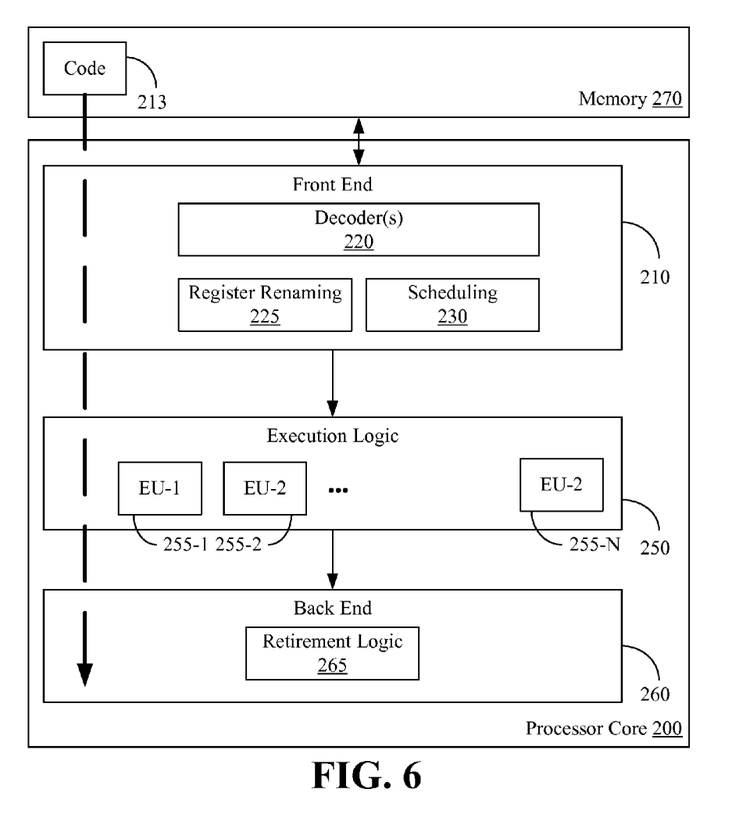
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 22 (FIG. 3) and/or the method 34 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
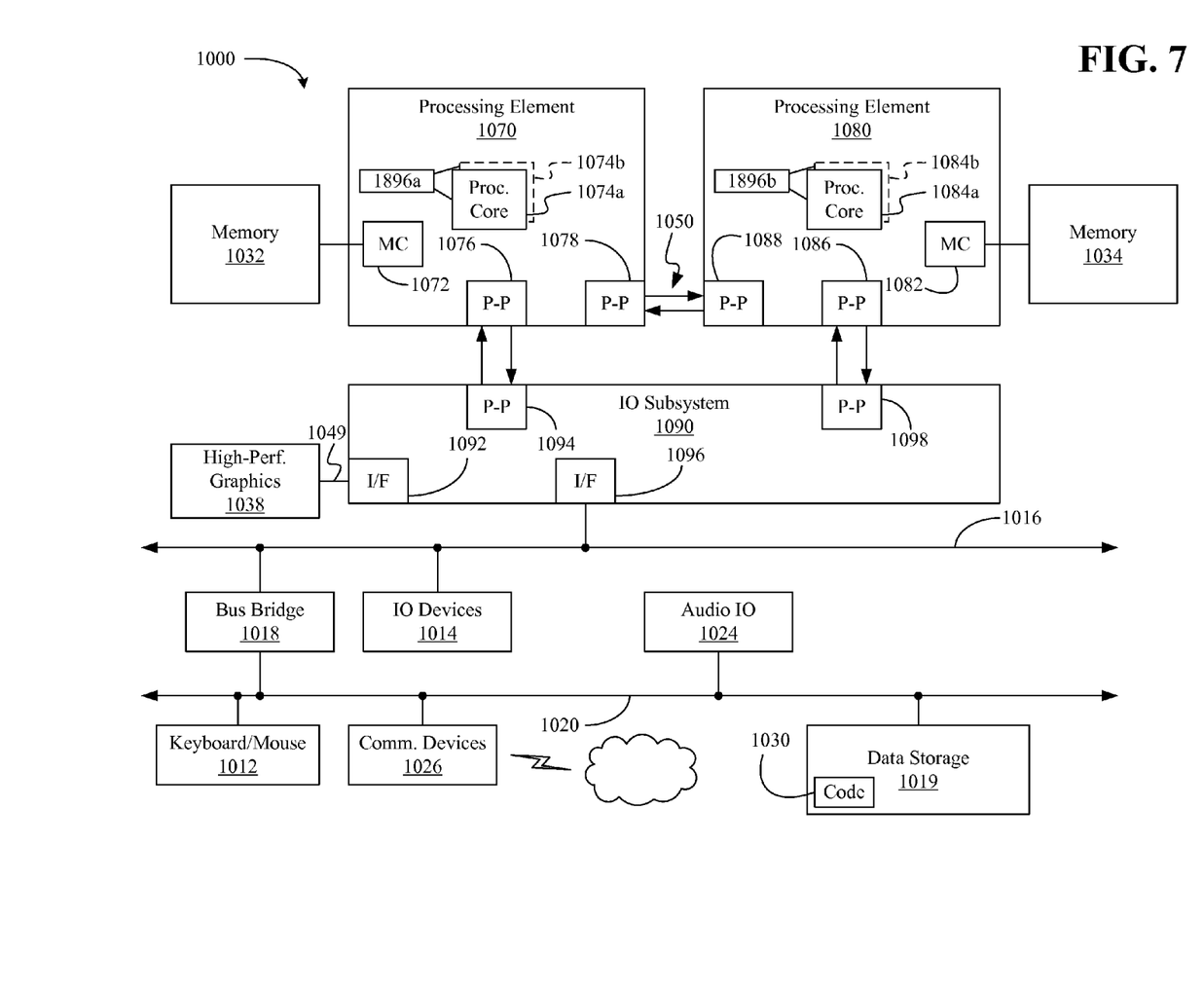
FIG. 7 is a block diagram of an example of a system according to an embodiment.

Referring now to FIG. 7, shown is a block diagram of a system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (e.g., network controller, voice input system, person-to-person communication link on a multi-user system, stored document interpretation system, scanned document interpretation system, optical character recognition/OCR system, etc.), and a data storage unit 1019 such as a disk drive or other mass storage device which may include code 1030, in one embodiment. The communication device(s) may be in communication with a computer network in order to receive messages containing sentences to be processed by the code 1030, wherein the code 1030 may include instructions for performing embodiments of one or more of the methods described above. Thus, the illustrated code 1030 may implement the method 22 (FIG. 3) and/or the method 34 (FIG. 4), already discussed, and may be similar to the code 213 (FIG. 6), already discussed. The messages processed by the code 1030 may also be generated locally on the system 1000 and not sourced from the network. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include a system to automatically detect questions, comprising a network controller to receive a message containing a sentence, a clause identifier to separate the sentence into a plurality of clauses, an analyzer to apply a set of question detection rules to each of the plurality of clauses, and a sentence classifier to automatically designate the sentence as a question if the question detection rules indicate that at least one of the plurality of clauses is a question.

Example 2 may include the system of Example 1, wherein at least one of the question detection rules defines an order of a plurality of parts of speech.

Example 3 may include the system of Example 2, wherein the order permits intervening words that are not predefined.

Example 4 may include the system of any one of Examples 1 to 3, wherein one or more of the question detection rules defines a clause as a question if the clause includes a wh-word followed by a modal or auxiliary verb followed by a noun followed by a verb.

Example 5 may include the system of any one of Examples 1 to 3, wherein one or more of the question detection rules defines a clause as a question if the clause includes a modal or auxiliary verb followed by a noun followed by a verb.

Example 6 may include the system of any one of Examples 1 to 3, wherein one or more of the question detection rules defines a clause as a question if the clause begins with a BE or HAVE word followed by a noun.

Example 7 may include a method of automatically detecting questions, comprising separating a sentence into a plurality of clauses, applying a set of question detection rules to each of the plurality of clauses, and automatically designating the sentence as a question if the question detection rules indicate that at least one of the plurality of clauses is a question.

Example 8 may include the method of Example 7, wherein at least one of the question detection rules defines an order of a plurality of parts of speech.

Example 9 may include the method of Example 8, wherein the order permits intervening words that are not predefined.

Example 10 may include the method of any one of Examples 7 to 9, wherein one or more of the question detection rules defines a clause as a question if the clause includes a wh-word followed by a modal or auxiliary verb followed by a noun followed by a verb.

Example 11 may include the method of any one of Examples 7 to 9, wherein one or more of the question detection rules defines a clause as a question if the clause includes a modal or auxiliary verb followed by a noun followed by a verb.

Example 12 may include the method of any one of Examples 7 to 9, wherein one or more of the question detection rules defines a clause as a question if the clause begins with a BE or HAVE word followed by a noun.

Example 13 may include at least one computer readable storage medium comprising a set of instructions which, when executed by a computing device, cause the computing device to separate a sentence into a plurality of clauses, apply a set of question detection rules to each of the plurality of clauses, and automatically designate the sentence as a question if the question detection rules indicate that at least one of the plurality of clauses is a question.

Example 14 may include the at least one computer readable storage medium of Example 13, wherein at least one of the question detection rules defines an order of a plurality of parts of speech.

Example 15 may include the at least one computer readable storage medium of Example 14, wherein the order permits intervening words that are not predefined.

Example 16 may include the at least one computer readable storage medium of any one of Examples 13 to 15, wherein one or more of the question detection rules defines a clause as a question if the clause includes a wh-word followed by a modal or auxiliary verb followed by a noun followed by a verb.

Example 17 may include the at least one computer readable storage medium of any one of Examples 13 to 15, wherein one or more of the question detection rules defines a clause as a question if the clause includes a modal or auxiliary verb followed by a noun followed by a verb.

Example 18 may include the at least one computer readable storage medium of any one of Examples 13 to 15, wherein one or more of the question detection rules defines a clause as a question if the clause begins with a BE or HAVE word followed by a noun.

Example 19 may include an apparatus to automatically detect questions, comprising a clause identifier to separate a sentence into a plurality of clauses, analyzer to apply a set of question detection rules to each of the plurality of clauses, and a sentence classifier to automatically designate the sentence as a question of the question detection rules indicate that at least one of the plurality of clauses is a question.

Example 20 may include the apparatus of Example 19, wherein at least one of the question detection rules defines an order of a plurality of parts of speech.

Example 21 may include the apparatus of Example 20, wherein the order permits intervening words that are not predefined.

Example 22 may include the apparatus of any one of Examples 19 to 21, wherein one or more of the question detection rules defines a clause as a question if the clause includes a wh-word followed by a modal or auxiliary verb followed by a noun followed by a verb.

Example 23 may include the apparatus of any one of Examples 19 to 21, wherein one or more of the question detection rules defines a clause as a question if the clause includes a modal or auxiliary verb followed by a noun followed by a verb.

Example 24 may include the apparatus of any one of Examples 19 to 21, wherein one or more of the question detection rules defines a clause as a question if the clause begins with a BE or HAVE word followed by a noun.

Example 25 may include an apparatus to automatically detect questions, comprising means for separating a sentence into a plurality of clauses, means for applying a set of question detection rules to each of the plurality of clauses, and means for automatically designating the sentence as a question if the question detection rules indicate that at least one of the plurality of clauses is a question.

Example 26 may include the apparatus of Example 25, wherein at least one of the question detection rules defines an order of a plurality of parts of speech.

Example 27 may include the apparatus of Example 26, wherein the order is to permit intervening words that are not predefined.

Example 28 may include the apparatus of any one of Examples 25 to 27, wherein one or more of the question detection rules defines a clause as a question if the clause includes a wh-word followed by a modal or auxiliary verb followed by a noun followed by a verb.

Example 29 may include the apparatus of any one of Examples 25 to 27, wherein one or more of the question detection rules defines a clause as a question if the clause includes a modal or auxiliary verb followed by a noun followed by a verb.

Example 30 may include the apparatus of any one of Examples 25 to 27, wherein one or more of the question detection rules defines a clause as a question if the clause begins with a BE or HAVE word followed by a noun.

Thus, techniques described herein may break a sentence into its component clauses and then apply question detection rules to each clause separately. Accordingly, techniques do not require that question syntax be located at the beginning of the sentence. Moreover, techniques do not rely on an inflexible "bag of words" approach that may lead to false positives and/or false negatives. For example, the sentences "If you're going to be late, could you call me before you leave?" and "When will the meeting end?" may both be identified as questions despite the fact that the first sentence does not begin with a question-like structure. Furthermore, the sentence "I don't know what you should do?" may not be identified as a question even though it contains the word "what". Additionally, techniques do not rely on the use of question marks, which are often extraneously included (as in the previous example) or omitted in computer mediated communications such as emails, text messages, IMs, social networking posts, and so forth.

The automated question detection techniques provide a computationally inexpensive (e.g., "lightweight") solution that may be used in settings such as personal assistant (PA) and/or low power scenarios in which messages are deciphered and prioritized in real-time to determine if the user should be interrupted. For example, the PA might proactively (and tentatively) add an appointment if a colleague sends a lunch invitation: "I'm coming into town tomorrow, would you like to get lunch with Jamila and Ted".

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a processor;
   a network controller to receive a message containing a sentence;
   a clause identifier, implemented at least partly in one or more of configurable logic or fixed functionality logic hardware, to separate the sentence into a plurality of clauses;
   an analyzer, implemented at least partly in one or more of configurable logic or fixed functionality logic hardware, to apply a set of question detection rules to each of the plurality of clauses on a clause-by-clause basis; and
   a sentence classifier, implemented at least partly in one or more of configurable logic or fixed functionality logic hardware, to automatically designate the sentence as a question and to generate notification that the sentence is a question if the question detection rules indicate that at least one clause of the plurality of clauses is a question independent of a position of the at least one clause in the sentence to reduce computational overhead at the processor.

2. The system of claim 1, wherein at least one of the question detection rules defines an order of a plurality of parts of speech.

3. The system of claim 2, wherein the order permits intervening words that are not predefined.

4. The system of claim 1, wherein one or more of the question detection rules defines a clause as a question if the clause includes a wh-word followed by a modal or auxiliary word followed by a noun followed by a verb.

5. The system of claim 1, wherein one or more of the question detection rules defines a clause as a question if the clause includes a modal or auxiliary word followed by a noun followed by a verb.

6. The system of claim 1, wherein one or more of the question detection rules defines a clause as a question if the clause begins with a to be or to have word followed by a noun.

7. A method comprising:
   separating, by a clause identifier implemented at least partly in one or more of configurable logic or fixed functionality logic hardware, a sentence into a plurality of clauses;
   applying, by an analyzer implemented at least partly in one or more of configurable logic or fixed functionality logic hardware, a set of question detection rules to each of the plurality of clauses on a clause-by-clause basis; and
   automatically designating, by a sentence classifier implemented at least partly in one or more of configurable logic or fixed functionality logic hardware, the sentence as a question and generating notification that the sentence is a question if the question detection rules indicate that at least one clause of the plurality of clauses is a question independent of a position of the at least one clause in the sentence to reduce computational overhead at a processor.

8. The method of claim 7, wherein at least one of the question detection rules defines an order of a plurality of parts of speech.

9. The method of claim 8, wherein the order permits intervening words that are not predefined.

10. The method of claim 7, wherein one or more of the question detection rules defines a clause as a question if the clause includes a wh-word followed by a modal or auxiliary word followed by a noun followed by a verb.

11. The method of claim 7, wherein one or more of the question detection rules defines a clause as a question if the clause includes a modal or auxiliary word followed by a noun followed by a verb.

12. The method of claim 7, wherein one or more of the question detection rules defines a clause as a question if the clause begins with a to be or to have word followed by a noun.

13. At least one non-transitory computer readable storage medium comprising a set of instructions which, when executed by a computing device, cause the computing device to:
   separate, by a clause identifier implemented at least partly in one or more of configurable logic or fixed functionality logic hardware, a sentence into a plurality of clauses;
   apply, by an analyzer implemented at least partly in one or more of configurable logic or fixed functionality logic hardware, a set of question detection rules to each of the plurality of clauses on a clause-by-clause basis; and
   automatically designate, by a sentence classifier implemented at least partly in one or more of configurable logic or fixed functionality logic hardware, the sentence as a question and to generate notification that the sentence is a question if the question detection rules indicate that at least one clause of the plurality of clauses is a question independent of a position of the at least one clause in the sentence to reduce computational overhead at a processor.

14. The at least one non-transitory computer readable storage medium of claim 13, wherein at least one of the question detection rules defines an order of a plurality of parts of speech.

15. The at least one non-transitory computer readable storage medium of claim 14, wherein the order permits intervening words that are not predefined.

16. The at least one non-transitory computer readable storage medium of claim 13, wherein one or more of the question detection rules defines a clause as a question if the clause includes a wh-word followed by a modal or auxiliary word followed by a noun followed by a verb.

17. The at least one non-transitory computer readable storage medium of claim 13, wherein one or more of the question detection rules defines a clause as a question if the clause includes a modal or auxiliary word followed by a noun followed by a verb.

18. The at least one non-transitory computer readable storage medium of claim 13, wherein one or more of the question detection rules defines a clause as a question if the clause begins with a to be or to have word followed by a noun.

19. An apparatus comprising:
   a processor;
   a clause identifier implemented at least partly in one or more of configurable logic or fixed functionality logic hardware to separate a sentence into a plurality of clauses;
   an analyzer implemented at least partly in one or more of configurable logic or fixed functionality logic hardware to apply a set of question detection rules to each of the plurality of clauses on a clause-by-clause basis; and
   a sentence classifier implemented at least partly in one or more of configurable logic or fixed functionality logic hardware to automatically designate the sentence as a question and to generate notification that the sentence is a question if the question detection rules indicate that at least one clause of the plurality of clauses is a question independent of a position of the at least one clause in the sentence to reduce computational overhead at the processor.

20. The apparatus of claim 19, wherein at least one of the question detection rules defines an order of a plurality of parts of speech.

21. The apparatus of claim 20, wherein the order permits intervening words that are not predefined.

22. The apparatus of claim 19, wherein one or more of the question detection rules defines a clause as a question if the clause includes a wh-word followed by a modal or auxiliary word followed by a noun followed by a verb.

23. The apparatus of claim 19, wherein one or more of the question detection rules defines a clause as a question if the clause includes a modal or auxiliary word followed by a noun followed by a verb.

24. The apparatus of claim 19, wherein one or more of the question detection rules defines a clause as a question if the clause begins with a to be or to have word followed by a noun.

\* \* \* \* \*